(12) United States Patent
Hirota et al.

(10) Patent No.: US 6,986,498 B2
(45) Date of Patent: Jan. 17, 2006

(54) DIFFERENTIAL PRESSURE VALVE

(75) Inventors: Hisatoshi Hirota, Tokyo (JP); Tokumi Tsugawa, Tokyo (JP); Yuusuke Inoue, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 123 days.

(21) Appl. No.: 10/347,729

(22) Filed: Jan. 21, 2003

(65) Prior Publication Data

US 2003/0151011 A1 Aug. 14, 2003

(30) Foreign Application Priority Data

| Feb. 1, 2002 | (JP) | ........................ 2002-025669 |
| Aug. 22, 2002 | (JP) | ........................ 2002-242085 |
| Dec. 19, 2002 | (JP) | ........................ 2002-367739 |

(51) Int. Cl.
  *F16K 31/12* (2006.01)

(52) U.S. Cl. .................. 251/30.04; 251/30.03
(58) Field of Classification Search ............. 251/30.02, 251/30.03, 30.04, 30.01, 30.05
See application file for complete search history.

(56) References Cited

U.S. PATENT DOCUMENTS

| 2,329,001 | A | * | 9/1943 | Robinson | .................. 251/30.03 |
| 2,398,775 | A | * | 4/1946 | Beekley et al. | .......... 251/30.03 |
| 2,657,673 | A | * | 11/1953 | Littlefield | ................. 251/30.03 |
| 2,926,882 | A | * | 3/1960 | Russell | ..................... 251/30.03 |
| 2,990,155 | A | * | 6/1961 | Selinder | ................... 251/30.03 |
| 3,100,103 | A | * | 8/1963 | Bullard | ..................... 251/30.03 |
| 3,218,022 | A | * | 11/1965 | Lewis | ....................... 251/30.03 |
| 3,381,932 | A | * | 5/1968 | O'Kane | .................... 251/30.03 |
| 4,201,362 | A | * | 5/1980 | Nishimi et al. | ........... 251/30.05 |
| 6,142,445 | A | | 11/2000 | Kawaguchi et al. | |
| 6,315,266 | B1 | * | 11/2001 | Hirota et al. | ............. 251/30.01 |

FOREIGN PATENT DOCUMENTS

| DE | 1 058 800 | 6/1959 |
| EP | 1 069 359 A2 | 1/2001 |
| EP | 1 090 786 A1 | 4/2001 |
| JP | 2001027355 A | 1/2001 |

* cited by examiner

*Primary Examiner*—John Bastianelli
(74) *Attorney, Agent, or Firm*—Patterson, Thuente, Skaar & Christensen, P.A.

(57) ABSTRACT

A differential pressure valve simplified in construction includes a piston integrally formed with a main valve element and arranged on the upstream side of a main valve to define a chamber for introducing refrigerant from an inlet port. The piston has an orifice and a refrigerant passage for communicating with a chamber on a back surface side of the piston. The chamber is configured such that it can be connected, via a refrigerant passage and a pilot valve element, to a chamber on the downstream side of the main valve, which communicates with an outlet port.

14 Claims, 14 Drawing Sheets

DIFFERENTIAL PRESSURE VALVE

BACKGROUND OF THE INVENTION (1) Field of the Invention

This invention relates to a differential pressure valve, and more particularly to a differential pressure valve for controlling a flow rate of refrigerant such that a differential pressure across the valve becomes equal to a differential pressure set by a solenoid.

(2) Description of the Related Art

A refrigeration cycle e.g. of an automotive air conditioning system is known which condenses or cools high-temperature and high-pressure gaseous refrigerant compressed by a compressor by a condenser or gas cooler, changes the condensed or cooled refrigerant into low-temperature and low-pressure refrigerant by a pressure-reducing device, evaporates the low-temperature refrigerant by an evaporator, separates the evaporated refrigerant into gas and liquid by an accumulator, and returns gaseous refrigerant obtained by the separation to the compressor. As the pressure-reducing device of the system, a differential pressure valve is sometimes used.

When compared with a refrigeration cycle using a freon substitute as refrigerant, a refrigeration cycle using e.g. carbon dioxide as refrigerant is much higher in the pressure of the refrigerant to be controlled thereby, and hence a very large solenoid is required in directly controlling a valve element thereof. Therefore, the differential pressure valve used in such a pressure-reducing device is configured as a pilot-operated flow regulating valve.

Conventionally, a pilot-operated differential pressure valve has been proposed which is configured such that high-pressure refrigerant on an inlet side is guided to a main valve and a pilot valve; the pressure of the refrigerant controlled by the pilot valve is introduced into a pressure chamber closed by a piston to move the piston; and the piston operates a main valve element via a valve hole of a main valve from the downstream side of the main valve while permitting a very small amount of refrigerant to flow via an orifice from the piston to the downstream side of the main valve (see e.g. Japanese Laid-Open Patent Publication (Kokai) No. 2001-27355.)

The pilot valve is actuated by a solenoid, and the valve travel of the pilot valve, which is determined by a spring contained in the solenoid and the value of an electric current caused to flow through the solenoid, sets a differential pressure across the main valve. The differential pressure valve controls the flow rate of the refrigerant such that the differential pressure between an inlet and an outlet thereof becomes equal to the set differential pressure.

Further, in a conventional expansion valve, an inlet and an outlet for refrigerant are fixed since the refrigerant flows in the refrigeration cycle only in a fixed direction. In recent automotive vehicles, however, due to the improvement in combustion efficiency of the engine, the temperature of engine coolant used as a heat source does not rise high enough for heating. To overcome this problem, in the automotive air conditioning system as well, it is contemplated to construct the same as a heat pump-type air conditioning system capable of performing cooling and heating operations. This system is configured such that when cooling operation is performed, high-temperature and high-pressure refrigerant supplied from a compressor is caused to flow through an external heat exchanger, changed into low-temperature and low-pressure refrigerant by an expansion valve, and caused to flow through an internal heat exchanger within a compartment, whereas when heating operation is performed, the high-temperature and high-pressure refrigerant from the compressor is directly supplied to the internal heat exchanger within the compartment, and then caused to flow through the expansion valve. In short, the direction of flow of refrigerant flowing through the expansion valve is reversed between the cooling and heating operations. Therefore, when a differential pressure valve capable of causing refrigerant to flow only in one direction is used as the expansion valve, it is necessary to arrange two pairs of differential pressure valves and check valves in parallel with each other such that the two pairs cause the refrigerant to flow in respective opposite directions to each other, so as to enable bi-directional flow of the refrigerant.

In the conventional differential pressure valve, however, the main valve element of the main valve is actuated by the piston that is arranged on the downstream side of the main valve and operated by the pilot valve, and hence means for transmitting a driving force of the piston via the valve hole of the main valve is necessitated. This raises the problem of complicated construction of the differential pressure valve.

Further, in the heat pump-type air conditioning system capable of performing cooling and heating operations, two pairs of differential pressure valves are required for causing respective expanding actions to be carried out for cooling operation and heating operation, independently of each other, which increases the manufacturing costs of the system.

SUMMARY OF THE INVENTION

The present invention has been made in view of these points, and an object thereof is to provide a differential pressure valve simplified in construction.

Further, another object of the invention is to provide a differential pressure that is capable of coping with bi-directional flow of refrigerant and can be used as an expansion valve of a heat pump-type air conditioning system.

To solve the above problem, the present invention provides a pilot-operated differential pressure valve for controlling a flow rate of fluid such that a differential pressure of the fluid between an inlet and an outlet for the fluid becomes equal to a differential pressure set by a value of an electric current caused to flow through a solenoid, characterized by comprising a main valve having a main valve element arranged in a manner opposed to a main valve seat formed in a passage between the inlet and the outlet, from an upstream side of the main valve, a piston integrally formed with the main valve element to define a first chamber between the piston and the main valve seat, the first chamber communicating with the inlet, the piston having a restricted passage for communicating between the first chamber and a second chamber formed on an opposite side of the first chamber, and a pilot valve arranged between the second chamber and a third chamber communicating with the outlet, for controlling a pressure in the second chamber.

According to this differential pressure valve, the restricted passage existing in a refrigerant passage in which the pilot valve is arranged is formed in the piston on the upstream side of the pilot valve, thereby enabling the pilot valve to control refrigerant whose pressure has been reduced by the restricted passage. This makes it possible to arrange the piston on a side where the main valve element is located, and hence the piston can be integrally formed with the main valve element. This makes it possible to form the piston integrally with the main valve element since the piston can be arranged on a side where the main valve element is located, thereby making it possible to dispense with a member for transmitting the motion of the piston to the main valve element, and hence enable simplification of the construction of the differential pressure valve Further, the present invention is configured to further include first and second check valves arranged between a first port and the first chamber and between a second port and the first chamber, respectively, for permitting the fluid to flow from the first port and the second port to the first chamber, and third and fourth check valves arranged between the first port and the third chamber and between the second port and the third chamber, respectively, for permitting the fluid to flow from the third chamber to the first port and the second port, whereby the fluid can be caused to flow bi-directional.

According to this differential pressure valve, when fluid is introduced into the first port, the pressure of the fluid causes the first check valve to be opened to close the second check valve, and at the same time causes the third check valve to be closed to open the fourth check valve. Therefore, the fluid is caused to flow into the second port through the first check valve, the pilot-operated differential pressure valve, and the fourth check valve. Inversely, when fluid is introduced into the second port, the pressure of the fluid causes the first check valve to be closed to open the second check valve, and at the same time causes the third check valve to be opened to close the fourth check valve. Therefore, the fluid is caused to flow into the first port through the second check valve, the pilot-operated differential pressure valve, and the third check valve. Thus, by adding the four check valves to the differential pressure valve, when the fluid is introduced into either of the first port and the second port, the pressure of the introduced fluid switches the open and close conditions of the first to fourth check valves, to cause the fluid to flow through the pilot-operated differential pressure valve only in a fixed direction. This makes it possible to form a differential pressure valve capable of coping with bi-directional flow of fluid, thereby making it possible to apply the pressure differential valve to an expansion valve for a heat pump-type air conditioning system without increasing the costs of the system.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Hereinafter, embodiments of the present invention will be described in detail with reference to drawings. In the embodiments, a differential pressure valve according to the invention is applied to an expansion valve used in a refrigeration cycle of an electronic controlled automotive air conditioner as a pressure-reducing device, by way of example.

Figure 1:
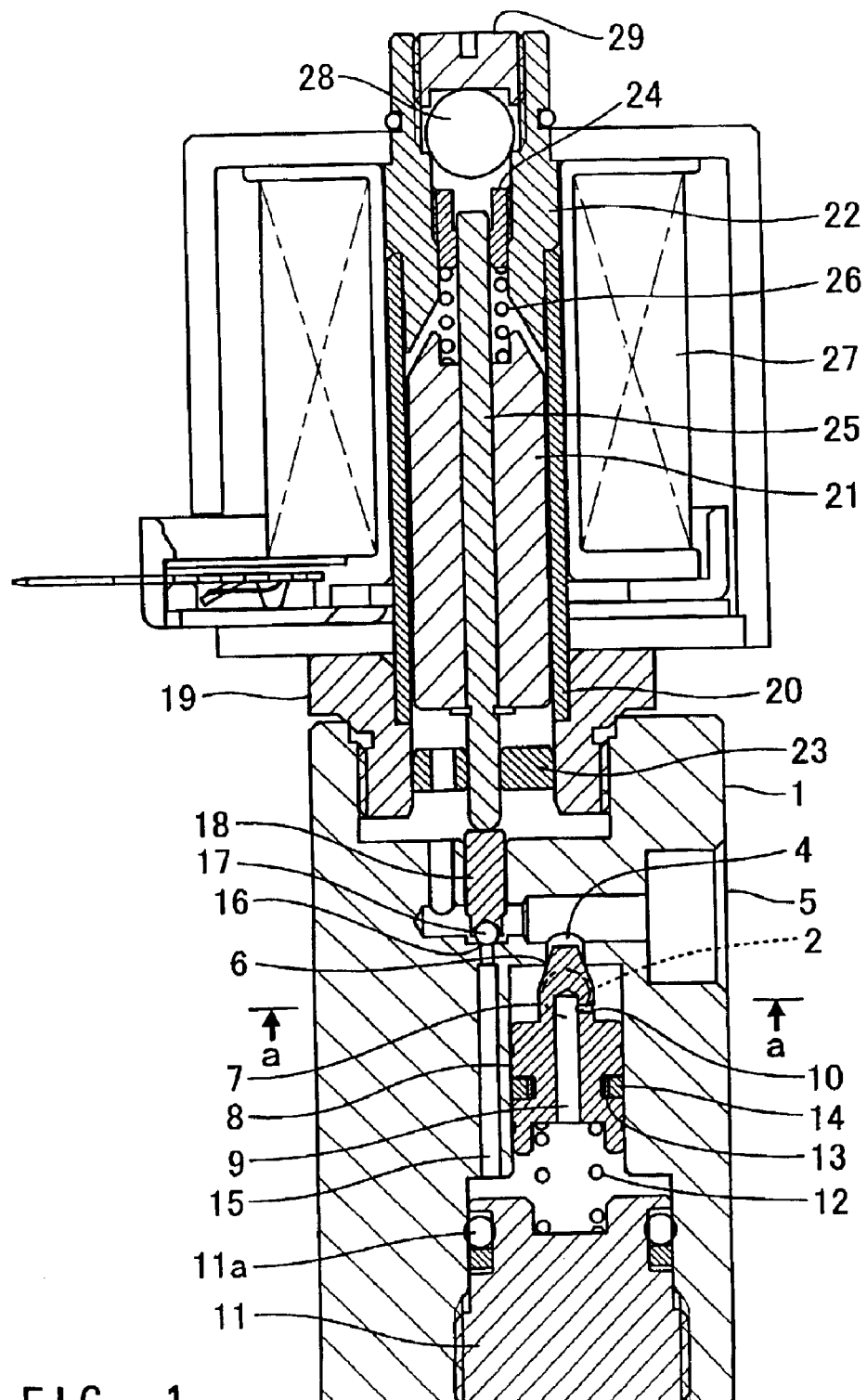
FIG. 1 is a longitudinal sectional view showing the construction of a differential pressure valve according to a first embodiment of the invention.
Figure 2:
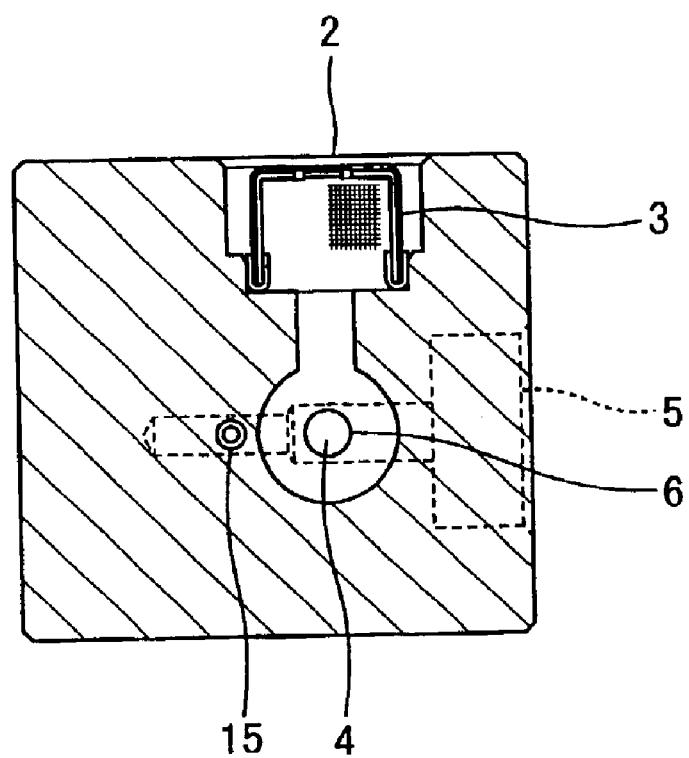
FIG. 2 is a cross-sectional view of the differential pressure valve taken on line a—a of FIG. 1.

FIG. 1 is a longitudinal sectional view showing the construction of the differential pressure valve according to a first embodiment of the invention. FIG. 2 is a cross-sectional view taken on line a—a of FIG. 1.

The differential pressure valve according to the present invention has an inlet port 2 formed in a side of a body 1 such that it extends in a perpendicular direction to the plane of the sheet of FIG. 1, for receiving high-pressure refrigerant. As shown in FIG. 2, the inlet port 2 has a strainer 3 arranged therein such that the strainer 3 blocks a passage of the inlet port 2. The inlet port 2 communicates with an outlet port 5 via a refrigerant passage 4. In an intermediate portion of the refrigerant passage 4, a main valve seat 6 is integrally formed with the body 1. There is arranged a main valve element 7 in a manner opposed to the main valve seat 6 from the upstream side, to form a main valve together with the main valve seat 6. The main valve element 7 is integrally formed with a piston 8 which can move forward and backward in a direction in which the main valve element 7 moves toward and away from the main valve seat 6. The piston 8 defines a first chamber 47 between the same and the main valve seat 6, into which refrigerant is introduced from the inlet port 2. The piston 8 has a refrigerant passage 9 that is formed along a central axis thereof and opens in a lower end face of the piston 8, as viewed in the figure. The refrigerant passage 9 communicates with an orifice 10 which laterally extends through the main valve element 7. The refrigerant passage 9 and the orifice 10 form a restricted passage which allows high-pressure refrigerant introduced into the chamber 47 formed on an upper side of the piston 8, as viewed in the figure, to flow into a second chamber 48 formed on a lower side of the piston 8, as viewed in the figure. The chamber 48 formed on the lower side of the piston 8, as viewed in the figure, is closed by an adjusting screw 11, and between the piston 8 and the adjusting screw 11, there is arranged a spring 12 for urging the piston 8 in a main valve-closing direction. The adjusting screw 11 is screwed into the body 1 such that it can adjust the load of the spring 12, and externally sealed by an O-ring 11a from the outside. The piston 8 has a groove circumferentially formed in an outer periphery thereof and a tension ring 13 and a backup ring 14 are fitted in the groove. The tension ring 13 pushes the backup ring 14 against an inner wall of a cylinder in which the piston 8 is received, thereby increasing the sliding resistance of the piston 8, which suppresses generation of noise due to vibrations occurring when the main valve opens and closes through a very small valve travel, and prevents leakage of refrigerant along the periphery of the piston 8.

The chamber 48 formed by the piston 8 and the adjusting screw 11 communicates with a third chamber 49 on the downstream side of the main valve, that is, a chamber 49 communicating with the outlet port 5, via a refrigerant passage 15 formed in the body 1. A pilot valve seat 16 is formed at a location between the refrigerant passage 15 and the chamber 49. A ball-shaped pilot valve element 17 is arranged in a manner opposed to the pilot valve seat 16 from a downstream side thereof, thereby forming a pilot valve together with the pilot valve seat 16. The pilot valve element 17 is supported by a shaft 18 arranged for moving forward and backward in a direction in which the pilot valve element 17 moves toward and away from the pilot valve seat 16.

A solenoid for controlling the pilot valve is arranged at an upper portion of the body 1. The solenoid is comprised of a cap 19 screwed into an upper end of the body 1, a sleeve 20 having a lower end thereof rigidly fitted in the cap 19, a plunger 21 axially arranged in the sleeve 20 such that it can move forward and backward therein, a core 22 rigidly fitted in an upper end of the sleeve 20 to close the sleeve 20, a shaft 25 axially arranged through the plunger 21 and having a lower end thereof supported by a bearing 23 press-fitted in the cap 19 and an upper end thereof supported by an adjusting screw 24 screwed into a hole axially formed through the core 22, a spring 26 which is arranged between the plunger 21 and the adjusting screw 24, for urging the shaft 18 holding the pilot valve element 17 via the shaft 25 in the direction of closing of the pilot valve, and a solenoid coil 27 arranged outside the sleeve 20. The adjusting screw 24 is used for adjusting the load of the spring 26 contained in the solenoid. In the present embodiment, the plunger 21 is configured such that the outer peripheral surface thereof is prevented from being brought into contact with the inner wall of the sleeve 20 by supporting the shaft 25 by two-point support at opposite ends thereof with the bearing 23 and the adjusting screw 24, whereby the sliding resistance of the plunger 21 is reduced. A central hole of the core 22 into which the adjusting screw 24 is screwed is closed by a ball 28, and the ball 28 is retained by a screw 29 screwed into an upper end opening of the core 22.

In the solenoid control valve constructed as above, first, when the solenoid coil 27 is not energized and hence no refrigerant is introduced into the inlet port 2, as shown in FIG. 1, the main valve element 7 is seated on the main valve seat 6 by the spring 12 to place the main valve in its closed state. The pilot valve element 17 as well is seated on the pilot valve seat 16 by the spring 26 contained in the solenoid to place the pilot valve in its closed state.

Now, when high-pressure refrigerant is introduced into the inlet port 2, the refrigerant is guided into the chamber 47 above the piston 8. Since the piston 8 has a larger pressure-receiving area than that of the main valve element 7, the pressure of the introduced refrigerant moves the piston 8 downward by overcoming the spring force of the spring 12, whereby the refrigerant flows via the main valve into the chamber communicating with the outlet port 5.

The refrigerant introduced into the chamber 47 above the piston 8 is also introduced into the chamber 48 below the piston 8 via the orifice 10 of the main valve element 7 and the refrigerant passage 9 of the piston 8, and further supplied to the pilot valve via the refrigerant passage 15 formed in the body 1. At this time, since the pilot valve is closed, the pressure in the chamber 48 below the piston 8 is gradually increased, which causes the piston 8 to move upward and attempt to close the main valve.

When the pressure in the chamber 48 below the piston 8 becomes so high that a differential pressure across the pilot valve exceeds a predetermined value, the refrigerant pushes open the pilot valve element 17 to flow into the chamber 49 communicating with the outlet port 5. Since this reduces pressure in the chamber 48 below the piston 8, the piston 8 is moved downward, as viewed in the figure, so that the amount of refrigerant flowing out through the main valve into the outlet port 5 is increased.

As the refrigerant flows out into the outlet port 5 to thereby reduce a refrigerant pressure on the upstream side of the main valve, the pressure of refrigerant supplied to the pilot valve is also reduced, so that the pilot valve element 17 is moved in a valve-closing direction. This increases the pressure of refrigerant introduced into the chamber 48 below the piston 8, to thereby move the piston 8 upward, as viewed in the figure. Since the main valve element 7 is urged in a valve-closing direction by the upward movement of the piston 8, the main valve reduces the flow rate of refrigerant to increase the pressure of refrigerant on the upstream side of the main valve. The above operations are repeatedly carried out to thereby control a differential pressure across the main valve to a fixed value. The differential pressure across the main valve at this time is determined based on the load of the spring 26 within the solenoid.

Further, when the solenoid coil 27 is energized, the plunger 21 is attracted toward the core 22, and the spring force of the spring 26 urging the pilot valve element 17 in the valve-closing direction is reduced to decrease the differential pressure set to the pilot valve. When the value of an electric current energizing the solenoid coil 27 is increased, a force for attracting the plunger 21 to the core 22 is increased, whereby it is possible to further decrease the differential pressure set to the pilot valve, that is, the differential pressure across the differential pressure valve.

Figure 3:
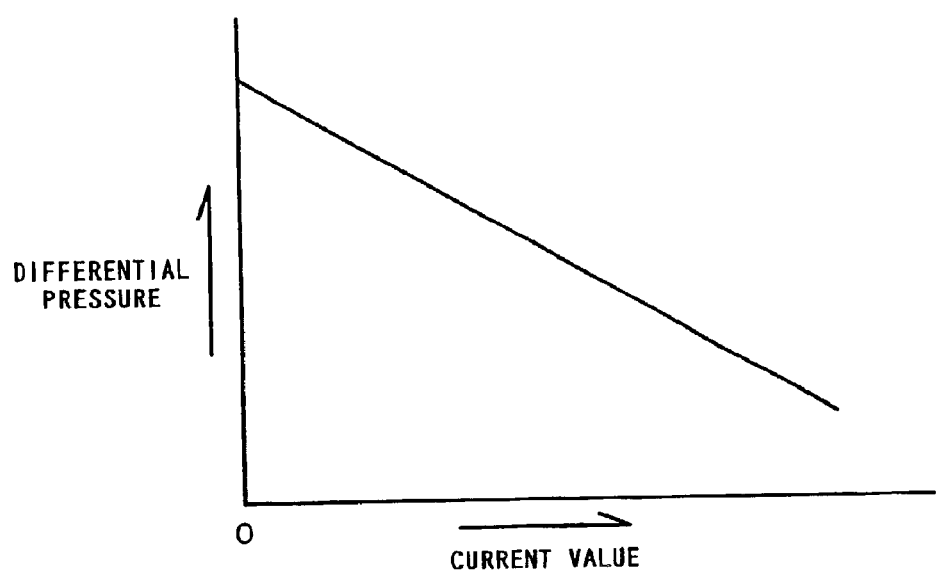
FIG. 3 is a diagram showing a change in differential pressure set to a pilot valve relative to the value of a solenoid current.

FIG. 3 shows how the differential pressure set to the pilot valve changes with respect to the value of a solenoid current.

In the figure, the abscissa indicates the value of an electric current supplied to the solenoid coil 27, and the ordinate indicates a differential pressure set to the differential pressure valve.

In the differential pressure valve constructed as above, by increasing the value of the electric current caused to flow through the solenoid coil 27, the force for attracting the plunger 21 to the core 22 is increased to act on the spring 26 in the direction of weakening the spring force thereof. This makes it possible to set the differential pressure to a small value, as shown in FIG. 3. Inversely, as the value of the electric current is decreased, the differential pressure can be set to a larger value, and when the value of the electric current is set to "0", the set differential pressure becomes the maximum. As described above, the differential pressure across the differential pressure valve can be set such that it is proportionally changed depending on the value of the electric current caused to flow through the solenoid coil 27.

By the way, when the above differential pressure valve is employed as an expansion valve in a refrigeration cycle of an automotive air conditioning system, it becomes necessary to modify the essential characteristic of the differential pressure valve such that the differential pressure across the valve is controlled to a constant level irrespective of the flow rate of refrigerant, depending on the method of controlling a compressor in the refrigeration cycle. In the following, this point will be explained in detail.

The refrigeration cycle of an automotive air conditioning system is mainly comprised of a compressor, a condenser or a gas cooler, an expansion valve, an evaporator, and an accumulator, among which the compressor and the expansion valve each control the flow rate of refrigerant. In a variable displacement compressor, to control the flow rate of refrigerant, an electronic control valve is sometimes used which performs differential pressure control such that the difference between the discharge pressure and the suction pressure is constant irrespective of the flow rate of the refrigerant. When the differential pressure control is employed as a method of controlling the variable displacement compressor, the use of the differential pressure valve as an expansion valve requires some consideration.

More specifically, when differential pressure controls are carried out for both of the variable displacement compressor and the expansion valve, respectively, there is a possibility of occurring conflict between the two controls. Although the controls do not conflict with each other so long as target differential pressures set to the variable displacement compressor and the expansion valve are identical, it is sometimes impossible to control the expansion valve if the target differential pressures are different from each other. Now, let it be assumed that pressure losses in the condenser or the gas cooler, the evaporator, and the accumulator can be disregarded. In this case, it is possible to consider that the discharge pressure of refrigerant discharged from the variable displacement compressor and the pressure of refrigerant at an inlet of the expansion valve are substantially equal to each other, and the pressure of refrigerant discharged from an outlet of the expansion valve and the pressure of refrigerant at an inlet of the variable displacement compressor are substantially equal to each other. Therefore, e.g. in a case where a differential pressure set to the expansion valve is lower than a differential pressure set to the variable displacement compressor, the expansion valve is always fully opened, and in an opposite case, the expansion valve is always fully closed. In these cases, it is possible to prevent the expansion valve from becoming uncontrollable, by modifying the essential characteristic of the differential pressure valve that the differential pressure across the expansion valve remains unchanged in spite of a change in the flow rate of refrigerant.

There are four methods of modifying the essential characteristic of the differential pressure valve. A first one is a method of changing a spring constant in the main valve, a second one is a method of changing the valve angle of the main valve, a third one is a method of changing a spring constant in the pilot valve, and a fourth one is a method of changing the valve angle of the pilot valve.

Figure 4:
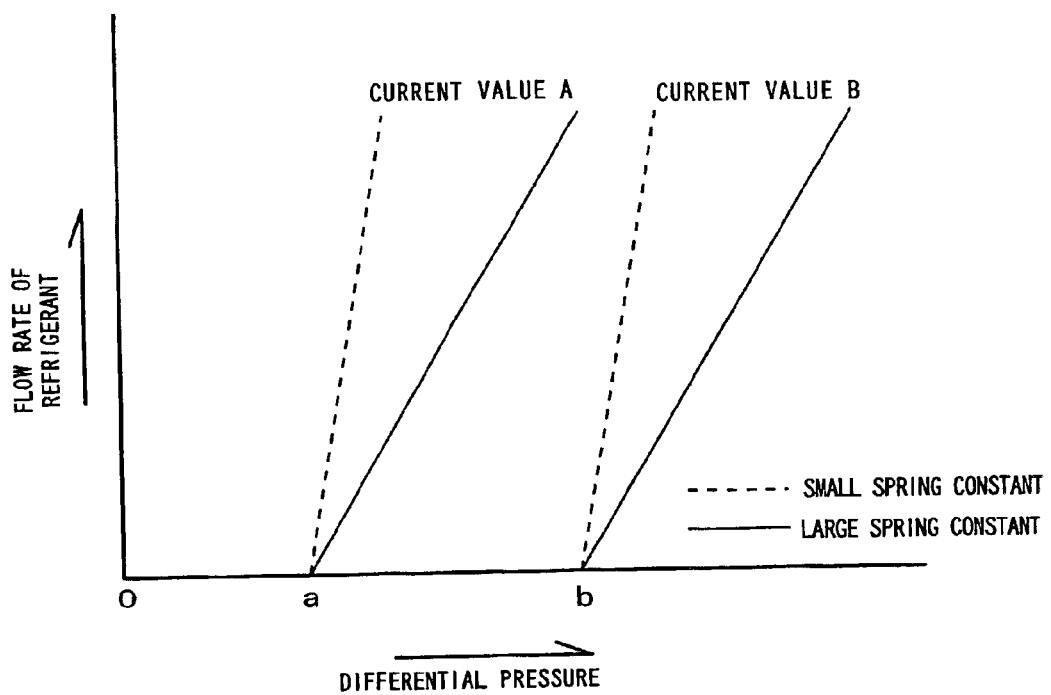
FIG. 4 is a diagram showing changes in a flow rate of refrigerant relative to set differential pressures, which occur in accordance with changes in a spring constant.

FIG. 4 shows changes in the flow rate of refrigerant relative to the set differential pressure, which occur in accordance with changes in the spring constant.

In the figure, the abscissa indicates the set differential pressure, and the ordinate indicates the flow rate of refrigerant. The differential pressure valve has a characteristic of maintaining the set differential pressure at a constant level irrespective of changes in the flow rate of refrigerant. For instance, when the value of an electric current flowing through the solenoid is set to an electric current value A and the differential pressure is set to a, the differential pressure is maintained substantially constant even when the flow rate of refrigerant is changed, as shown by a dotted line in the figure. The differential pressure-flow rate characteristic curve remains the same even when the value of the solenoid current is changed. For instance, also when the value of the solenoid current is set to a smaller electric current value B and the differential pressure is set to b, the same characteristic can be obtained. Thus, the differential pressure valve functions as a constant differential pressure valve. Actually, the differential pressure-flow rate characteristic curve is slightly inclined, since the spring constant of the spring 12 urging the main valve element 7 in a valve-closing direction cannot be reduced to "0", and an effective pressure-receiving area of the main valve element 7 is changed as the main valve is opened. The differential pressure valve having the constant differential pressure characteristic can be applied as it is, when the control of the variable capacity compressor is executed by a control method other than the differential pressure control, e.g. by a flow rate control, since no conflict occurs between the controls.

On the other hand, in a case of a system which controls the variable displacement compressor by the differential pressure control, the spring 12 urging the main valve element 7 in a valve-closing direction thereof has a spring constant thereof set to a larger value. As a result, as shown by solid lines in FIG. 4, the characteristic curve come to be largely inclined. More specifically, the differential pressure valve is configured to have a characteristic such that the flow rate of refrigerant is increased, the differential pressure across the differential pressure valve becomes larger than a differential pressure set by the value of the solenoid current. When such a differential pressure valve is used as the expansion valve, the differential pressure-flow rate characteristic curve of a flow rate control valve for controlling the variable displacement compressor and that of the differential pressure valve are not parallel but intersect with each other. Accordingly, the differential pressure valve comes to perform control in a manner setting toward the point of the intersection, and hence it becomes possible to effect stable control of the system.

This characteristic of the differential pressure across the differential pressure valve becoming larger than a differential pressure set by the value of the solenoid current with an increase in the flow rate of refrigerant, in short, the characteristic of the inclination of the characteristic curve becoming larger, can be also realized by setting the spring constant of the spring 26 urging the pilot valve element 17 to a large value.

Further, the inclination of the characteristic curve of the differential pressure valve can be also changed by changing the valve angles of the main valve and the pilot valve, as described hereinbefore.

Figure 5A:
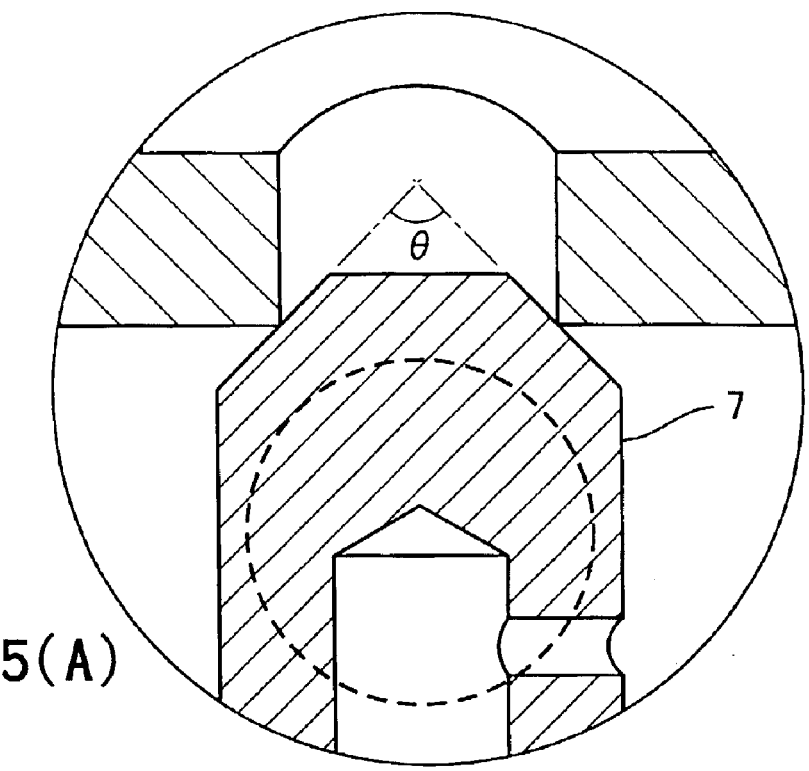
FIGS. 5(A),(B) are views showing valve angles of a main valve, in which (A) shows an example of the main valve having a large valve angle, and (B) shows an example of the main valve having a small valve angle.
Figure 5B:
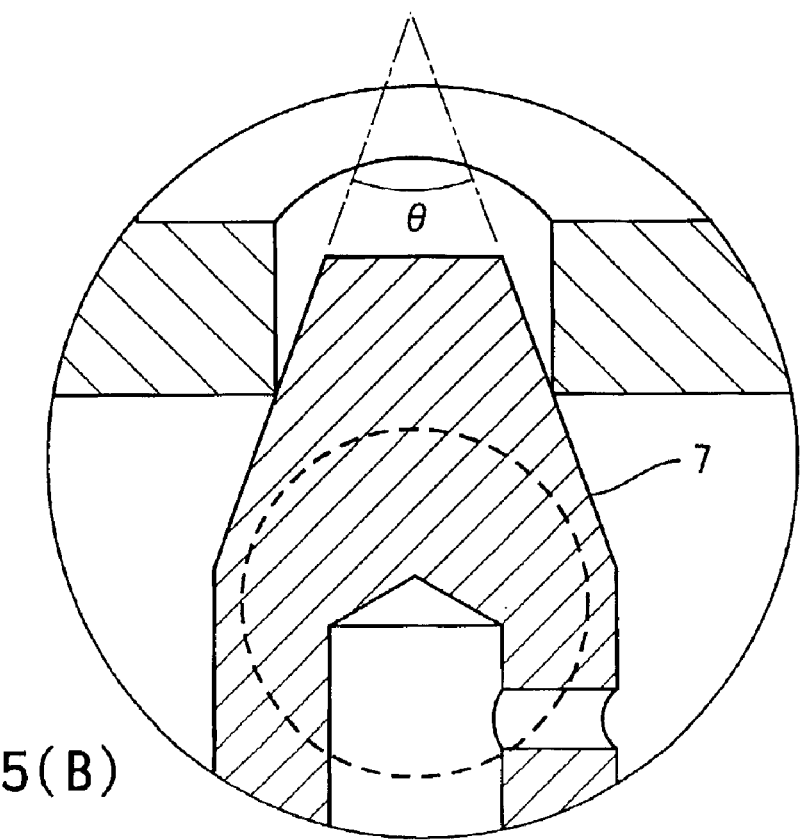
Figure 6A:
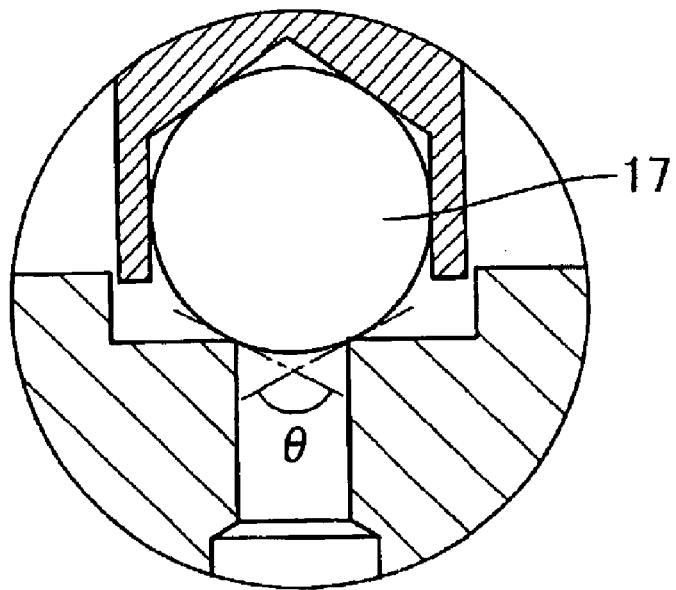
FIGS. 6(A),(B) are views showing valve angles of a pilot valve, in which (A) shows an example of the pilot valve having a large valve angle, and (B) shows an example of the pilot valve having a small valve angle.
Figure 6B:
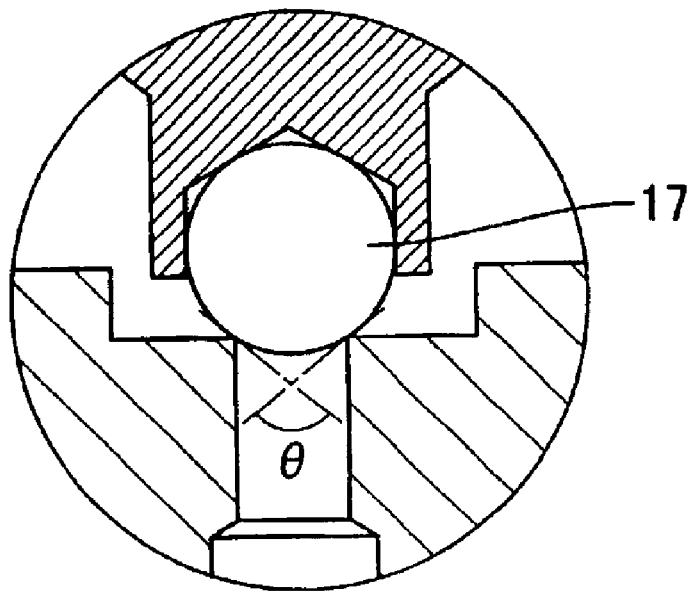
Figure 7:
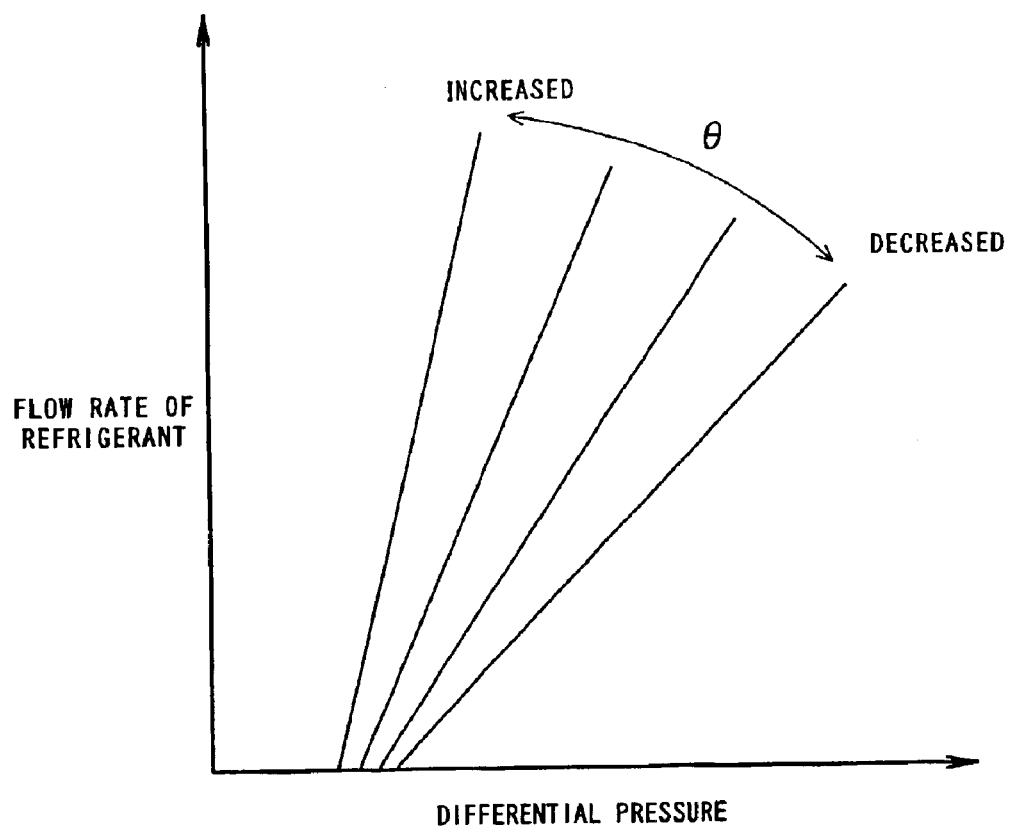
FIG. 7 is a diagram showing changes in a flow rate of refrigerant relative to set differential pressures, which occur in accordance with changes in a valve angle.

FIG. 5 provides views showing the valve angles of the main valve, in which (A) shows an example of the main valve having a large valve angle, and (B) shows an example of the main valve having a small valve angle. FIG. 6 provides views showing the valve angles of the pilot valve, in which (A) shows an example of the pilot valve having a large valve angle, and (B) shows an example of the pilot valve having a small valve angle. FIG. 7 shows changes in the flow rate of refrigerant relative to set differential pressures, which occur in accordance with changes in the valve angle.

As to the main valve, when the valve angle θ of the main valve element 7 at an end thereof is large as shown in (A) of FIG. 5, the differential pressure across the differential pressure valve is not largely changed by an increase in the flow rate of refrigerant, as shown in FIG. 7. However, as shown in (B) of FIG. 5, when the valve angle θ is decreased, the differential pressure across the differential pressure valve is increased with an increase in the flow rate of refrigerant, and as shown in FIG. 7, the characteristic curve of the differential pressure valve comes to be largely inclined. This is because even if the vale element 7 is moved by the same lift amount, the rate of change in the lift amount is small.

As described above, the characteristic of the differential pressure valve is changed by the change in the valve angle of the main valve. The pilot valve also exhibits the same tendency. In the pilot valve, when the valve angle θ of the pilot valve element 17 is large due to a large diameter of the ball of the pilot valve element 17 as shown in (A) of FIG. 6, the differential pressure across the differential pressure valve is not largely changed with an increase in the flow rate of refrigerant, as shown in FIG. 7. However, when the diameter of the ball is decreased to decrease the valve angle θ as shown in (B) of FIG. 6, the characteristic curve of the differential pressure valve comes to be largely inclined as shown in FIG. 7.

As described hereinabove, by increasing the spring constant of the spring 12 of the main valve, by decreasing the valve angle θ of the same, by increasing the spring constant of the spring 26 of the pilot valve, or by decreasing the valve angle θ of the same, it is possible to adjust the differential pressure characteristic of the differential pressure valve such that control of the variable displacement compressor and control of the differential pressure valve do not conflict with each other.

Figure 8:
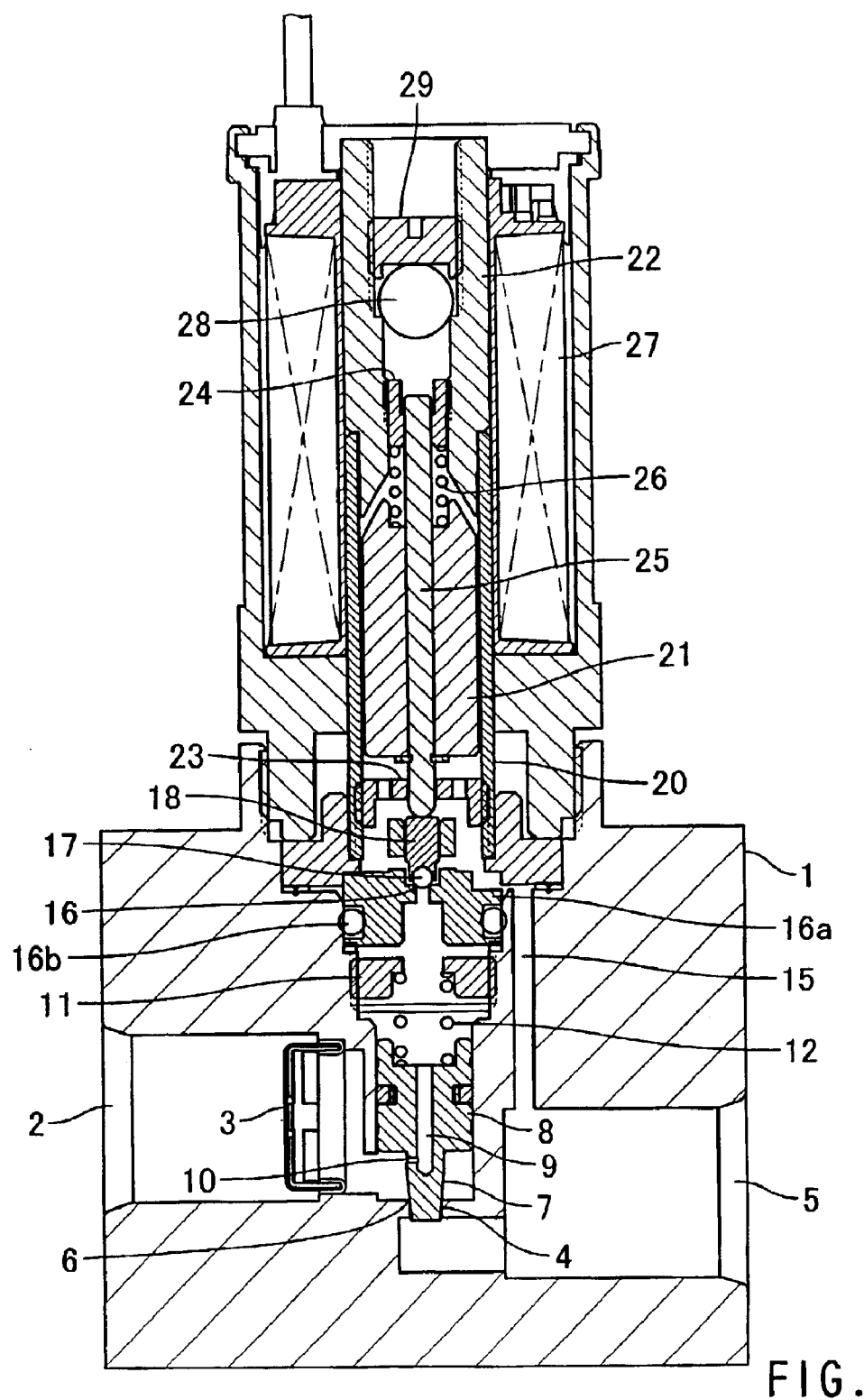
FIG. 8 is a longitudinal sectional view showing the construction of a differential pressure valve according to a second embodiment of the invention.

FIG. 8 shows a longitudinal cross-sectional view showing the construction of a differential pressure valve according to a second embodiment of the invention. It should be noted that in FIG. 8, component elements similar to those of the differential pressure valve shown in FIGS. 1 and 2 are designated by identical reference numerals, and detailed description thereof is omitted.

The differential pressure valve according to the second embodiment is configured similarly to the differential pressure valve according to the first embodiment in that a pilot valve is arranged in an intermediate portion of a refrigerant passage extending from a chamber on a back pressure side of a piston 8 integrally formed with a main valve to an outlet port 5, and the differential pressure across the main valve is controlled to a constant value set by the pilot valve, but differently from the same in that the location of the pilot valve is changed such that the main valve and the pilot valve are arranged on the same axis.

More specifically, a main valve element 7 and the piston 8 integrally formed with each other are arranged such that the main valve element 7 is directed downward as viewed in the figure, for opening and closing a refrigerant passage 4 between an inlet port 2 and an outlet port 5, and a spring 12 for urging the main valve element 7 and the piston. 8 in a valve-closing direction and an adjusting screw 11 are arranged above the main valve element 7 and the piston 8 integrally formed with each other. A plug 16a is arranged above the adjusting screw 11. This plug 16a has a pilot valve seat 16 and a guide both integrally formed therewith. The guide supports the shaft 18 holding the pilot valve element 17 such that the shaft 18 can move forward and backward. An O ring 16b seals between the body 1 and the plug 16a. A space upward of the pilot valve seat 16 is communicated via a refrigerant passage 15 with the outlet port 5. Further, a solenoid having the same construction as the differential pressure valve according to the first embodiment is arranged upward of the shaft 18.

According to this construction, the passage through which refrigerant passes has no intermediate portion sealed from the outside, and hence there is no fear of external leakage of the refrigerant. More specifically, although in the differential pressure valve according to the first embodiment, the O ring 11a seals the chamber on the back pressure side of the piston 8 from the outside, the differential pressure valve according to the second embodiment has no such a sealing member. It should be noted that although the O ring 16b is provided around the plug 16a, this is not for providing a seal against external leakage of refrigerant to the outside, but for providing a seal against internal leakage of the same.

The operation of the differential pressure valve according to the second embodiment is the same as that of the differential pressure valve according to the first embodiment, and hence detailed description thereof is omitted.

The differential pressure valve described above is applied to an air conditioning in which refrigerant flows only in one direction in the refrigeration cycle since the inlet and outlet of the refrigerant are fixed. On the other hand, in a heat pump-type air conditioning system, the direction of flow of refrigerant is reversed between heating operation and cooling operation, and hence to employ the differential pressure valve according to the first or second embodiment in the system, two pairs of such differential pressure valves and check valves are necessitated. This inconvenience is eliminated by a third embodiment of the invention which enables one differential pressure valve to cope with bi-directional flow of refrigerant. In the following, the differential pressure valve according to the third embodiment will be described in detail.

Figure 9:
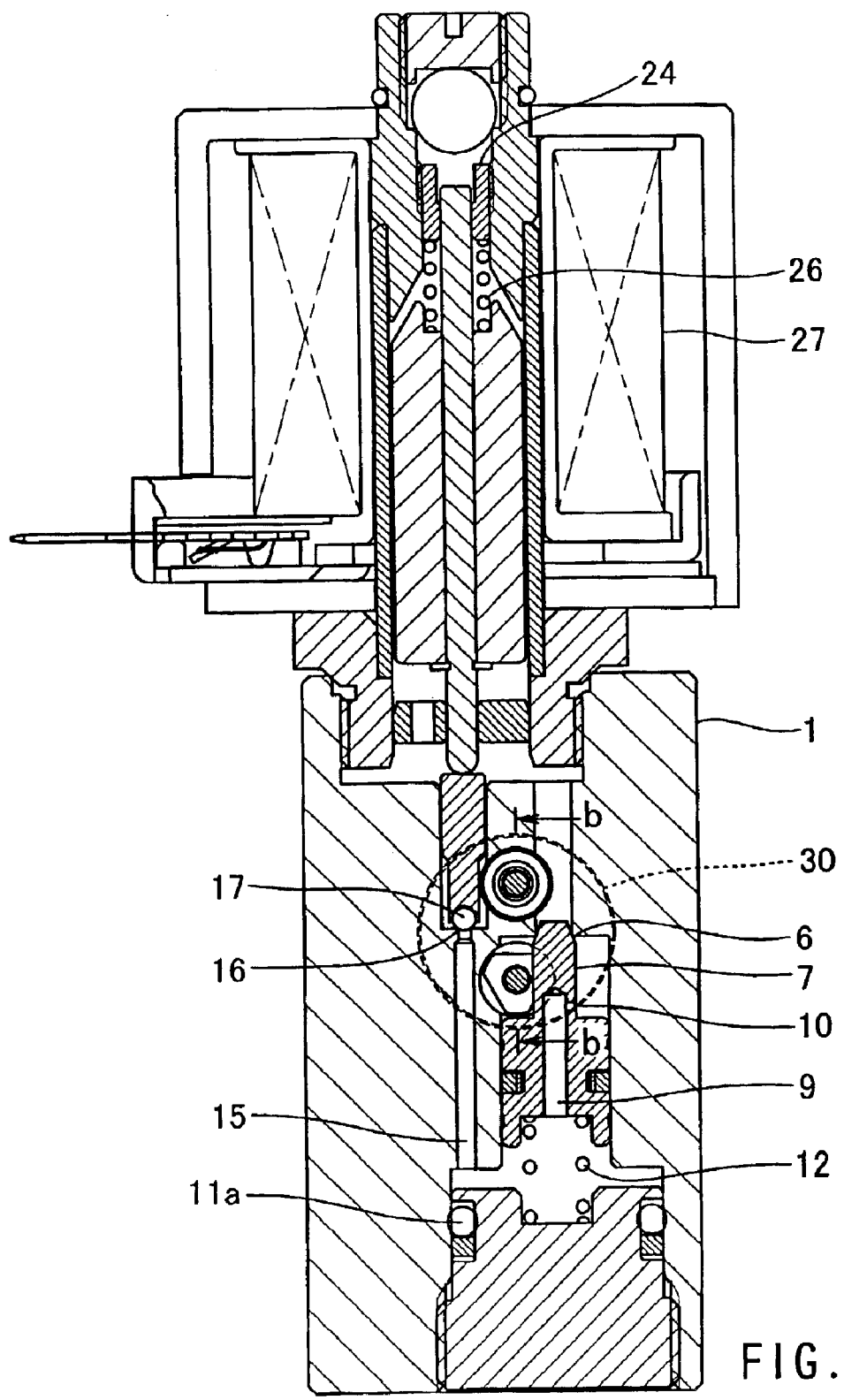
FIG. 9 is a longitudinal sectional view showing the construction of a differential pressure valve according to a third embodiment of the invention.
Figure 10A:
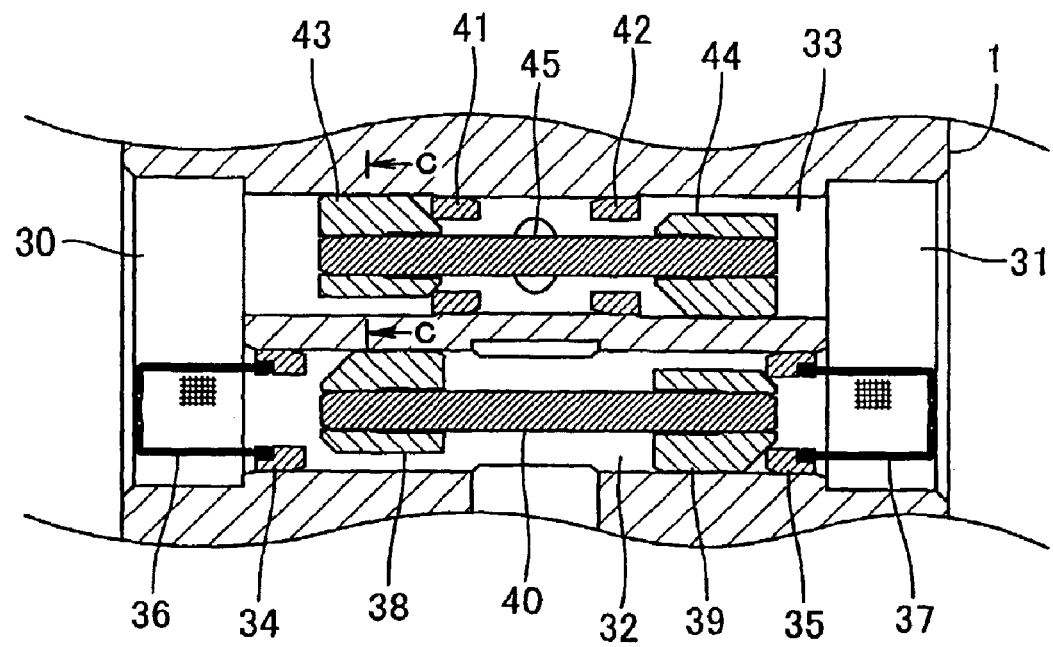
FIGS. 10(A),(B) are cross-sectional views showing essential elements of the FIG. 9 differential pressure valve, in which (A) is a cross-sectional view of the differential pressure valve taken on line b—b of FIG. 9, and (B) is a cross-sectional view of the same taken on line c—c of (A).
Figure 10B:
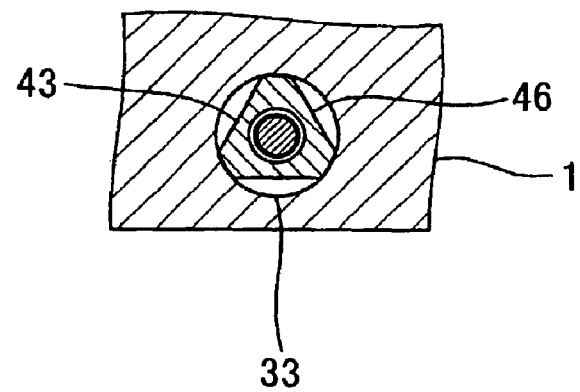
Figure 11A:
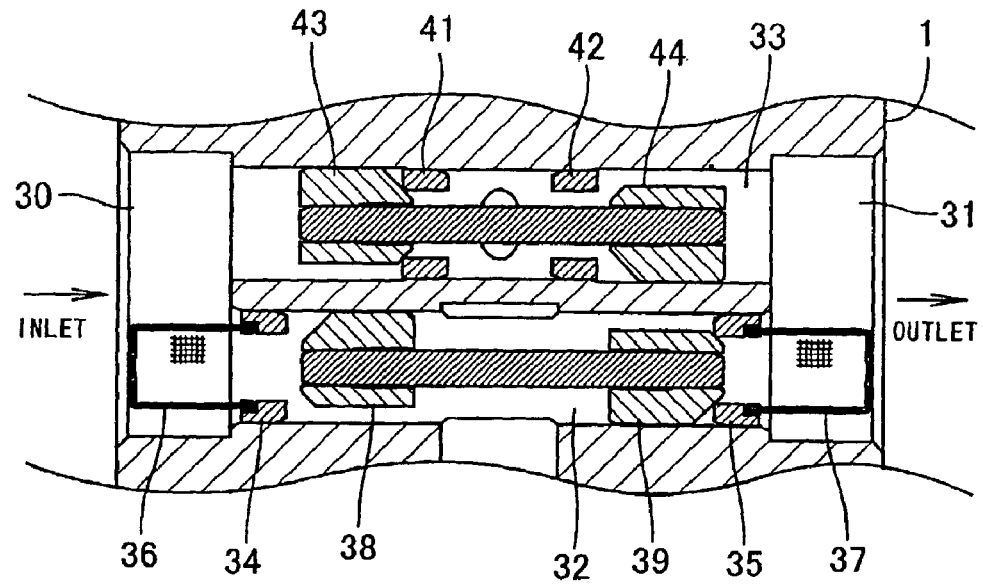
FIGS. 11(A),(B) are views which are useful in explaining the operations of the differential pressure valve according to the third embodiment of the invention, in which (A) shows an operation of the differential pressure valve in a first direction of flow of refrigerant, and (B) shows an operation of the differential pressure valve in a second direction of flow of refrigerant.
Figure 11B:
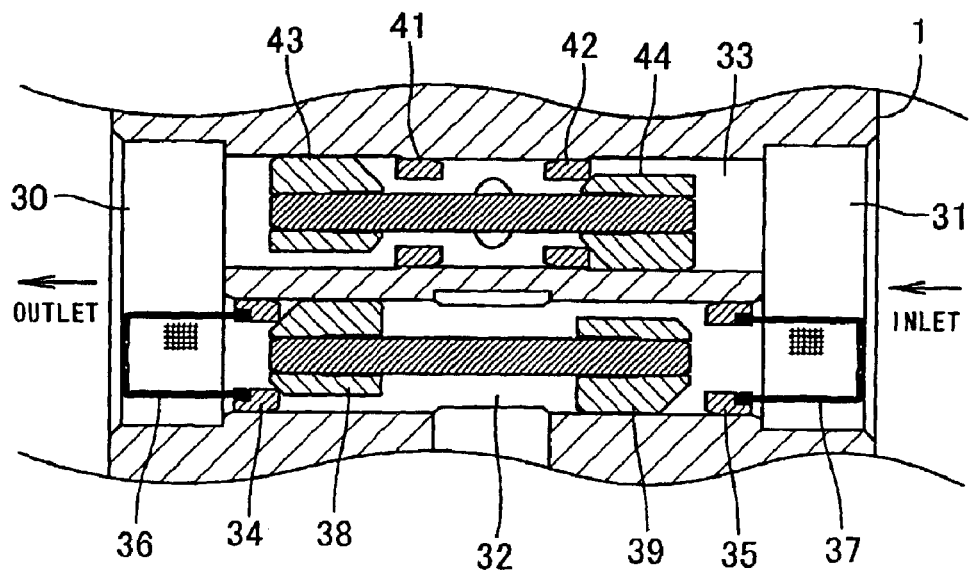

FIG. 9 is a longitudinal sectional view showing the construction of the differential pressure valve according to the third embodiment of the invention. FIG. 10 provides cross-sectional views showing essential elements of the FIG. 9 differential pressure valve, in which (A) is a cross-sectional view of the differential pressure valve taken on line b—b of FIG. 9, and (B) is a cross-sectional view of the same taken on line c—c of (A). FIG. 11 provides views which are useful in explaining operations of the differential pressure valve according to the third embodiment of the invention, in which (A) shows an operation of the differential pressure valve in a first direction of flow of refrigerant, and (B) shows an operation of the differential pressure valve in a second direction of flow of refrigerant. It should be noted that in FIG. 9, component elements similar to those of the differential pressure valve shown in FIGS. 1, 2, and 8 are designated by identical reference numerals, and detailed description thereof is omitted.

The differential pressure valve according to the third embodiment has a body 1 including first and second ports 30, 31 which form a refrigerant inlet and a refrigerant outlet, respectively. The differential pressure valve includes a flow path-switching mechanism arranged between the first and second ports 30, 31, for switching the direction of flow of refrigerant introduced from different directions of flow, such that the refrigerant is caused to flow through the main valve and the pilot valve in respective one directions, and as shown in detail in (A) of FIG. 10, an inlet refrigerant passage 32 and an outlet refrigerant passage 33 are formed in a manner connecting between the first and second ports 30, 31.

The inlet refrigerant passage 32 has valve seats 34, 35 arranged in both ends thereof. The valve seats 34, 35 have strainers 36, 37 fitted therein on the respective sides of the first and second ports 30, 31. In a manner opposed to the valve seats 34, 35, valve elements 38, 39, are arranged, respectively, such that they can move toward and away from the respective valve seats 34, 35 from inside, and at the same time the valve elements 38, 39 are connected to each other by a shaft 40. Thus, the valve elements 38, 39, and the valve seats 34, 35 form first and second check valves 50, 51 interlocked with each other to perform respectively reverse operations, for permitting refrigerant to flow inwardly from the opposite outsides of the inlet refrigerant passage 32, respectively. A space between the valve elements 38, 39 communicate with a chamber on the upstream side of a main valve defined by a main valve element 6 and a piston 8.

The outlet refrigerant passage 33 has valve seats 41, 42 arranged therein at locations close to a central portion thereof. In a manner opposed to the valve seats 41, 42, valve elements 43, 44, are arranged respectively, such that they can move toward and away from the respective valve seats 41, 42 from outside, and at the same time the valve elements 43, 44 are connected to each other by a shaft 45. Thus, the valve elements 43, 44, and the valve seats 41, 42 form third and fourth check valves 52, 53 interlocked with each other to perform respectively reverse operations, for permitting refrigerant to flow from the inside of the outlet refrigerant passage 33 to the opposite outsides thereof, respectively. A space between the valve seats 41, 42 communicates with a space on the downstream side of the main valve and a pilot valve.

As shown in (B) of FIG. 10 which illustrates a cross-section of the valve element 43 as a representative, the valve elements 38, 39, and the valve elements 43, 44 each have three (in the case of the illustrated example) cut-away portions 46 along an outer periphery thereof to form refrigerant passages, whereby the refrigerant passage on the downstream side of each check valve when it is open is secured.

In the solenoid control valve constructed as above, first, when a solenoid coil 27 is not energized and refrigerant is not introduced into the first port 30 or the second port 31, as shown in FIG. 9, a main valve element 7 is seated on a main valve seat 6 by a spring 12 to place the main valve in its closed state. A pilot valve element 17 as well is seated on a pilot valve seat 16 by a spring 26 contained in the solenoid to place a pilot valve in its closed state.

Now, for instance, when high-pressure refrigerant is introduced into the first port 30, as shown in (A) of FIG. 11, the valve elements 38, 43 are pushed by the pressure of the introduced refrigerant to be moved rightward as viewed in the figure. This causes the valve element 38 arranged in the inlet refrigerant passage 32 to move away from the valve seat 34, and the valve element 39 to be seated on the valve seat 35, and at the same time, the valve element 43 arranged in the outlet refrigerant passage 33 to be seated on the valve seat 41 and the valve element 44 to move away from the valve seat 42. This causes the space in the central portion of the inlet refrigerant passage 32 to be communicated with the first port 30, and disconnected from the second port 31. Further, this causes the space in the central portion of the outlet refrigerant passage 33 to be disconnected from the first port 30 and communicated with the second port 31.

As a result, the refrigerant flowing from the first port 30 through the strainer 36 into the inlet refrigerant passage 32 by pushing open the check valve 50 on the first port side of the inlet refrigerant passage 32, passes through the refrigerant passages formed by the cut-away portions 46 formed in the periphery of the valve element 38, into the space defined between the valve elements 38, 39, and thereafter enters the chamber on the upstream side of the main valve. This refrigerant is supplied to the pilot valve via an orifice 10 and refrigerant passages 9, 15. When a differential pressure across the pilot valve exceeds a predetermined value, the refrigerant pushes open the pilot valve element 17, and flows into the space defined between the valve seats 41, 42 in the central portion of the outlet refrigerant passage 33. Since this reduces pressure in a chamber below the piston 8, the piston 8 is moved downward, as viewed in the figure, and the main valve element 7 is moved away from the main valve seat 6 to open the main valve whereby the refrigerant introduced into the inlet port 2 flows out into the space between the valve seats 41, 42 in the outlet refrigerant passage 33 via the main valve. Further, the refrigerant flows out into the second port 31 through the check valve 53 whose valve element 44 is moved away from the valve seat 42, and the refrigerant passages formed by the cut-away portions 46 formed in the periphery of the valve element 44.

When the outflow of the refrigerant into the outlet port 5 reduces the pressure of refrigerant on the upstream side of the main valve, the pressure of refrigerant supplied to the pilot valve is also reduced to move the pilot valve element 17 in a valve-closing direction. Since this causes an increase in the pressure of refrigerant introduced into the chamber below the piston 8, the piston 8 is moved upward, as viewed in the figure, and the main valve element 7 is urged accordingly in a valve-closing direction. This causes the main valve to reduce the flow rate of refrigerant to thereby increase the pressure of refrigerant on the upstream side of the main valve. The above operations are repeatedly carried out to thereby control a differential pressure across the main valve to a fixed value. The differential pressure across the main valve at this time, in other words, a maximum differential pressure set to the pilot valve when the solenoid is not energized is determined by the load of the spring 26 within the solenoid, and the load is set by an adjusting screw 24.

Next, when high-pressure refrigerant is introduced into the second port 31, as shown in (B) of FIG. 11, the refrigerant pushes the valve element 44 in the outlet refrigerant passage 33 to cause the valve element 44 to be seated on the valve seat 42 therefore, and at the same time, the refrigerant flowing into the inlet refrigerant passage 32 via the strainer 37 pushes the valve element 39 to cause the same to move away the valve seat 35. This causes the other valve element 43 in the outlet refrigerant passage 33 to move away from the valve seat 41 therefore in a manner interlocked with the seating of the valve element 44, whereby the space in the central portion of the outlet refrigerant passage 33 is communicated with the first port 30. Further, the other valve element 38 in the inlet refrigerant passage 32 is seated on the valve seat 34 in a manner interlocked with the motion of the valve element 39 away from the valve seat 35, whereby the space in the central portion of the inlet refrigerant passage 32 is disconnected from the first port 30.

As a result, the refrigerant flowing from the second port 31 through the strainer 37 into the inlet refrigerant passage 32 by pushing open the check valve 51 on the second port side thereof, enters the chamber on the upstream side of the main valve, and is supplied to the pilot valve via the orifice 10 and the refrigerant passages 9, 15. When the differential pressure across the pilot valve exceeds a predetermined value, the refrigerant pushes open the pilot valve element 17, and flows into the first port 30 through the space in the central portion of the outlet refrigerant passage 33, and the check valve 52 on the first port side. This reduces the pressure in the chamber below the piston 8, so that the piston 8 is moved downward, as viewed in the figure, and the main valve element 7 is moved away from the main valve seat 6 to open the main valve whereby the refrigerant flows out into the first port 30 through the space in the central portion of the outlet refrigerant passage 33, and the check valve 52 on the first port side. The following operations are the same as those carried out when the high-pressure refrigerant is introduced into the first port 30.

Further, when the solenoid coil 27 is energized, a plunger 21 is attracted toward a core 22, and the spring force of the spring 26 urging the pilot valve element 17 in the valve-closing direction is reduced to decrease the differential pressure set to the pilot valve. When the value of an electric current energizing the solenoid coil 27 is increased, a force for attracting the plunger 21 toward the core 22 is increased, whereby it is possible to further decrease the differential pressure set to the pilot valve, that is, the differential pressure across the differential pressure valve.

Figure 12:
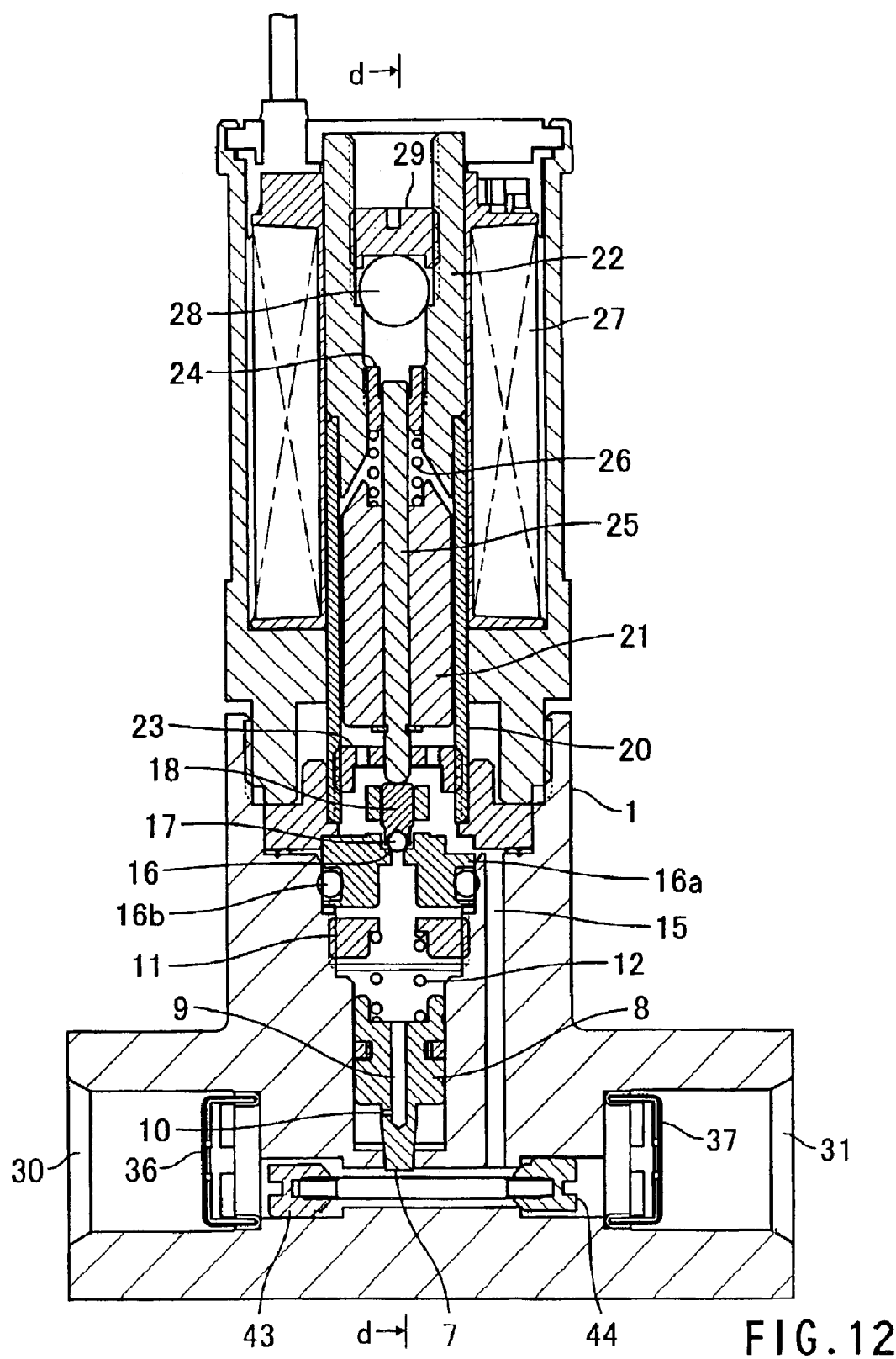
FIG. 12 is an longitudinal sectional view showing the construction of a differential pressure valve according to a fourth embodiment of the invention.
Figure 13:
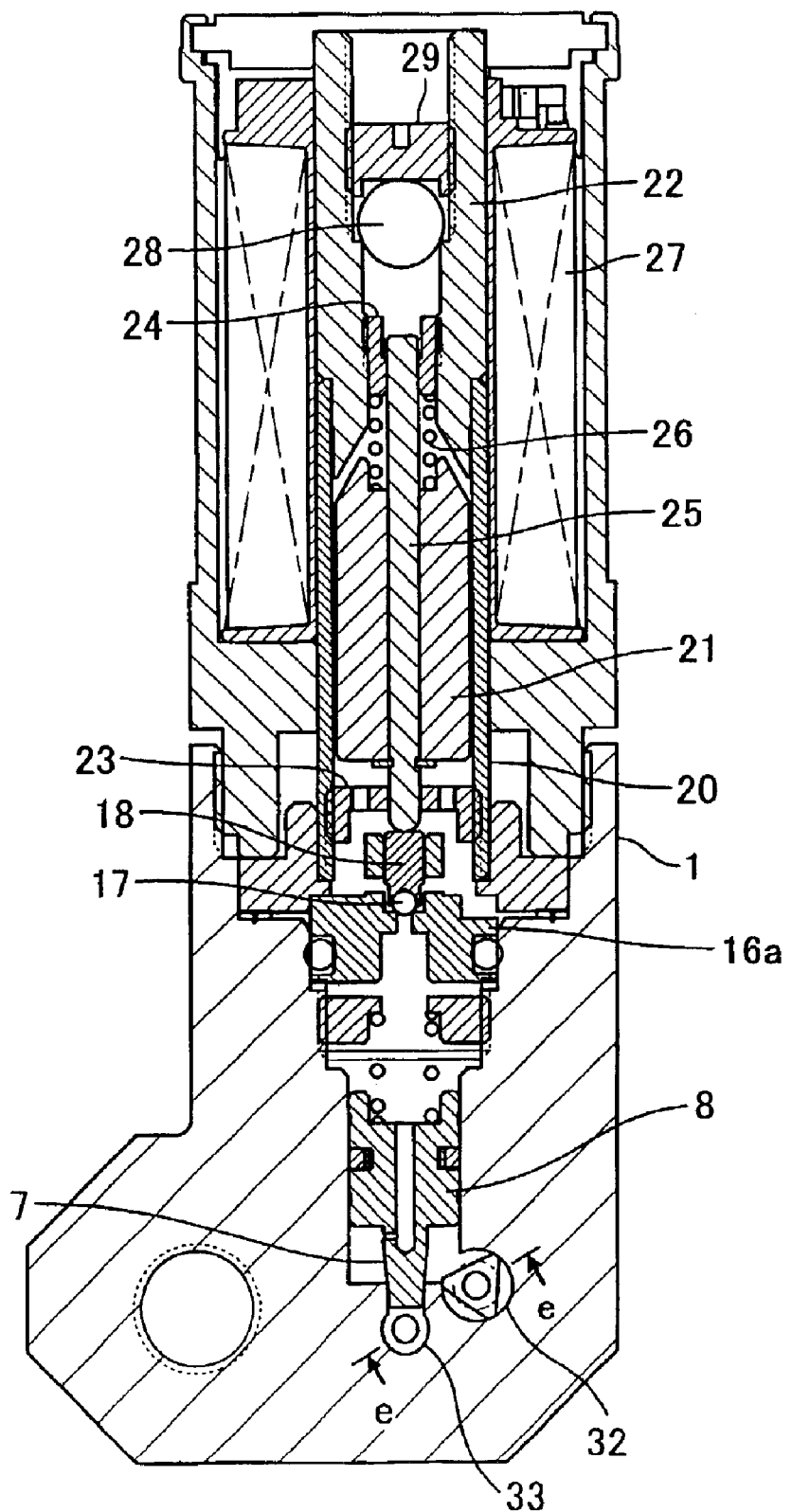
FIG. 13 is a cross-sectional view taken on line d—d of FIG. 12.
Figure 14A:
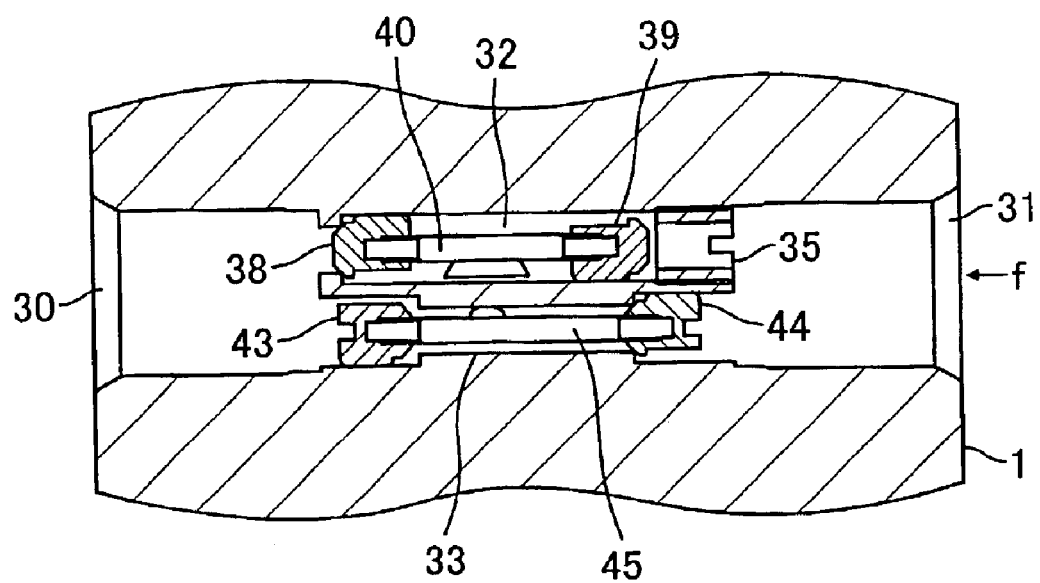
FIGS. 14(A),(B) are cross-sectional views showing a flow-path switching mechanism of the differential pressure valve, in which (A) is a cross-sectional view of the differential pressure valve taken on line e—e of FIG. 13, and (B) is a cross-sectional view of the same taken from a direction of f in (A).
Figure 14B:
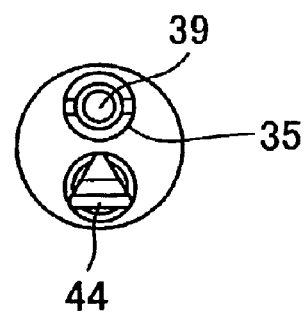

FIG. 12 is a longitudinal sectional view showing the construction of a differential pressure valve according to a fourth embodiment of the invention. FIG. 13 is a cross-sectional view taken on line d—d of FIG. 12, and FIG. 14 provides views showing the flow path-switching mechanism, in which (A) is a cross-sectional view taken on line e—e of FIG. 13, and (B) is a cross-sectional view taken from a direction of f. It should be noted that in FIGS. 12 to 14, component elements similar to or equivalent to those of the differential pressure valve shown in FIGS. 8 to 10 are designated by identical reference numerals, and detailed description thereof is omitted.

The differential pressure valve according to the fourth embodiment is configured similarly to that according to the second embodiment such that a main valve and a pilot valve are arranged on the same axis, and includes a flow path-switching mechanism according to the third embodiment for enabling bi-directional flow of refrigerant.

According to this differential pressure valve, the flow path-switching mechanism is arranged obliquely with respect to the axis of the pilot valve. As shown in FIGS. 12 and 13, an outlet refrigerant passage 33 containing two check valves for selectively causing refrigerant having passed through the main valve to flow to the first port 30 or the second port 31 is arranged below a port of the main valve as viewed in the figures, and an inlet refrigerant passage 32 containing two check valves for switching the flow path of refrigerant such that refrigerant introduced from the first port 30 or the second port 31 is caused to flow to a chamber on an upstream side of the main valve is arranged obliquely upward of the outlet refrigerant passage 33.

Referring to (A) of FIG. 14 showing a cross-section of this flow path-switching mechanism taken on a plane extending through the respective axes of the inlet refrigerant passage 32 and the outlet refrigerant passage 33, in the inlet refrigerant passage 32, a valve seat associated with a valve element 38 on the first port side is integrally formed with a valve body 1, and a valve seat 35 associated with a valve element 39 on the second port side is formed by a member having a screw-fit or a press-fit construction. The valve elements 38, 39 in a state coupled to the shaft 40 by screw-fitting in advance is inserted into the inlet refrigerant passage 32, and then the valve seat 35 is mounted. Further, one valve element 43, for instance, in a state coupled to a shaft 45 by screw-fitting in advance is inserted into the outlet refrigerant passage 33, and then the other valve element 44 is coupled to the shaft 40, whereby the valve elements 43, 44 are mounted in the outlet refrigerant passage 33. The valve elements 38, 39, 43, 44 are each formed to have a substantially triangular cross-section e.g. by cutting three D-shaped portions off the periphery thereof, thereby securing refrigerant passages for allowing refrigerant to flow therethrough.

The operation of the differential pressure valve according to the fourth embodiment is the same as that of the differential pressure valve according to the third embodiment, and hence detailed description thereof is omitted.

Although the preferred embodiments of the present invention have been described in detail hereinabove, the present invention is not limited to the above particular embodiments. For instance, although in the above embodiments, so as to supply reduced-pressure refrigerant to the pilot valve, the restricted passage is formed by forming the orifice 10 in the main valve 7, and the refrigerant passage 9 in the piston 8, this is not limitative, but this orifice 10 may be replaced by an orifice directly formed in the piston 8 such that it extends therethrough. Further, as for the restricted passage, the orifice 10 may be replaced by a groove which is formed in the outer periphery of the piston 8 in the direction of motion thereof, or alternatively, a clearance between the piston 8 and a cylinder which contains the piston 8 in the body 1 in a manner movable forward and backward may be made use of.

As described hereinbefore, according to the present invention, the differential pressure valve is configured such that a restricted passage existing in a refrigerant path in which a pilot valve is arranged is formed in a piston on the upstream side of the pilot valve, thereby enabling the pilot valve to control refrigerant whose pressure has been reduced by the restricted passage. This makes it possible to form the piston integrally with the main valve element since the piston can be arranged on a side where the main valve element is located, thereby making it possible to dispense with a member for transmitting the motion of the piston to the main valve element, and hence enable simplification of the construction of the differential pressure valve and reduction of the manufacturing costs thereof.

Further, the differential pressure valve includes additional four check valves, whereby into whichever of two ports is introduced the fluid, the fluid is caused to flow through a pilot-operated differential pressure valve only in a fixed direction. This makes it possible to form a differential pressure valve capable of coping with bi-directional flow of fluid and form an expansion valve for a heat pump-type air conditioning system by one differential pressure valve, thereby enabling reduction of the costs of the system.

Furthermore, in the differential pressure valve according to the present invention, no flexible member exists in pressure-receiving portions, and at the same time the diameter of a main valve can be increased in size. Therefore, the differential pressure valve is especially useful in effecting stable control of refrigerant which is very high in the differential pressure and flows at a high flow rate, as in a case where the valve is applied to a pressure-reducing device of an automotive air conditioning system that uses carbon dioxide as refrigerant.

Further, when a main valve, a piston, and a pilot valve are arranged on the same axis, an adjusting screw for adjusting load of a spring urging the main valve and piston integrally formed with each other in a valve-closing direction is arranged within a body at a location between a chamber on a back pressure side of the piston and the pilot valve. This makes an external seal unnecessary, so that the reliability of the valve against the external leakage of refrigerant therefrom can be enhanced, and the adjusting screw need not have a portion for arranging a seal member thereat or enhance pressure resistance by increasing the number of screw threads thereof. Therefore, the axial dimension of the adjusting screw can be shortened.

The foregoing is considered as illustrative only of the principles of the present invention. Further, since numerous modifications and changes will readily occur to those skilled in the art, it is not desired to limit the invention to the extract construction and applications shown and described, and accordingly, all suitable modifications and equivalents may be regarded as falling within the scope of the invention in the appended claims and their equivalents.

What is claimed is:

1. A pilot-operated differential pressure valve for controlling a flow rate of fluid such that a differential pressure of the fluid between an inlet and an outlet for the fluid becomes equal to a differential pressure set by a value of an electric current caused to flow through a solenoid, the differential pressure valve comprising:
   a main valve having a main valve element arranged in a manner opposed to a main valve seat formed in a passage between the inlet and the outlet, from an upstream side of said main valve;
   a piston integrally formed with said main valve element to define a first chamber between said piston and said main valve seat, said first chamber communicating with said inlet, said piston having a restricted passage for communicating between said first chamber and a second chamber formed on an opposite side of said piston of said first chamber; and
   a pilot valve having a pilot valve element arranged in a manner opposed to a pilot valve seat from a downstream side, said pilot valve arranged between said second chamber and a third chamber in communication with said outlet, for controlling a pressure in said second chamber.

2. The differential pressure valve according to claim 1, wherein said restricted passage is an orifice formed through said piston for communicating between said first chamber and said second chamber.

3. The differential pressure valve according to claim 1, wherein said restricted passage is a groove formed in a periphery of said piston along a direction in which said piston moves forward and backward.

4. The differential pressure valve according to claim 1, wherein said restricted passage is a clearance between said piston and a cylinder accommodating said piston in a manner movable forward and backward.

5. A differential pressure valve according to claim 1, including differential pressure characteristic-adjusting means for making the differential pressure of the fluid between said inlet and said outlet larger than the differential pressure set by the value of the electric current caused to flow through said solenoid, in accordance with an increase in the flow rate of the fluid.

6. The differential pressure valve according to claim 5, wherein said differential pressure characteristic-adjusting means is a spring constant of a spring for urging said piston in a direction of closing said main valve element, the differential pressure of the fluid between said inlet and said outlet being made larger than the set differential pressure in accordance with the increase in the flow rate of the fluid, by increasing the spring constant.

7. The differential pressure valve according to claim 5, wherein said differential pressure characteristic-adjusting means is a valve angle of said main valve element, the differential pressure of the fluid between said inlet and said outlet being made larger than the set differential pressure in accordance with the increase in the flow rate of the fluid, by decreasing the valve angle.

8. The differential pressure valve according to claim 5, wherein said differential pressure characteristic-adjusting means is a spring constant of a spring contained in said solenoid, for urging said pilot valve element in a valve-closing direction thereof, the differential pressure of the fluid between said inlet and said outlet being made larger than the set differential pressure in accordance with the increase in the flow rate of the fluid, by increasing the spring constant.

9. The differential pressure valve according to claim 5, wherein said differential characteristic-adjusting means is a valve angle of a pilot valve element of said pilot valve, the differential pressure of the fluid between said inlet and said outlet being made larger than the set differential pressure in accordance with the increase in the flow rate of the fluid, by decreasing the valve angle.

10. The differential pressure valve according to claim 1, including a flow path-switching mechanism having first and second check valves arranged between a first port and said first chamber and between a second port and said first chamber, respectively, for permitting the fluid to flow from said first port and said second port to said first chamber, and third and fourth check valves arranged between said first port and said third chamber and between said second port and said third chamber, respectively, for permitting the fluid to flow from said third chamber to said first port and said second port, whereby the fluid can be caused to flow bi-directional between said first port and said second port.

11. The differential pressure valve according to claim 10, wherein said flow path-switching mechanism is configured such that a first valve element of said first check valve and a second valve element of said second check valve are connected to each other by a first shaft, and a third valve element of said third check valve and a fourth valve element of said fourth check valve are connected to each other by a second shaft, whereby when the fluid is introduced from said first port, pressure of the introduced fluid causes said first check valve to be fully opened to fully close said second check valve in a manner interlocked therewith, and at the same time causes said third check valve to be fully closed to fully open said fourth check valve in a manner interlocked therewith, whereas when the fluid is introduced from said second port, pressure of the introduced fluid causes said second check valve to be fully opened to fully close said first check valve in a manner interlocked therewith, and at the same time causes said fourth check valve to be fully closed to fully open said third check valve in a manner interlocked therewith.

12. The differential pressure valve according to claim 1, wherein said main valve, said piston, and said pilot valve are arranged on the same axis.

13. The differential pressure valve according to claim 1, characterized by being applied to a pressure-reducing device for carbon dioxide which is high in the differential pressure and demands flow rate control at a high flow rate.

14. The differential pressure valve according to claim 1, including a flow path-switching mechanism having first and second check valves arranged between a first port and said first chamber and between a second port and said first chamber, respectively, for permitting the fluid to flow from said first port and said second port to said first chamber, and third and fourth check valves arranged between said first port and said third chamber and between said second port and said third chamber, respectively, for permitting the fluid to flow from said third chamber to said first port and said second port, whereby the fluid can be caused to flow bi-directional between said first port and said second port, wherein said main valve, said piston, and said pilot valve are arranged on the same axis.

* * * * *